Nov. 22, 1960 B. H. YORK 2,961,022
RECESS-GRIPPING DRIVER
Filed April 6, 1959
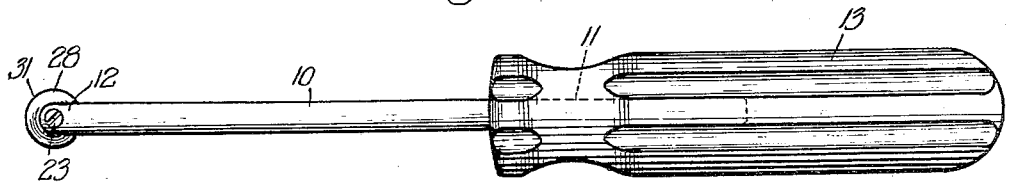
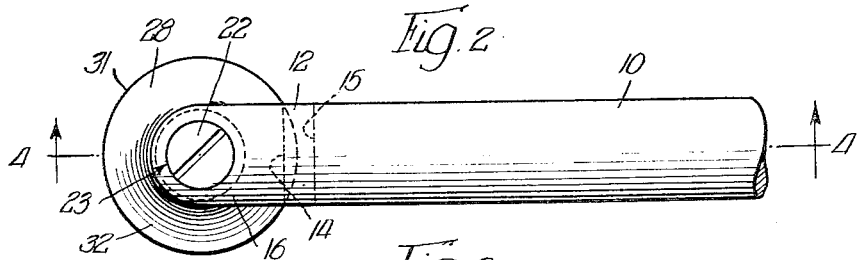
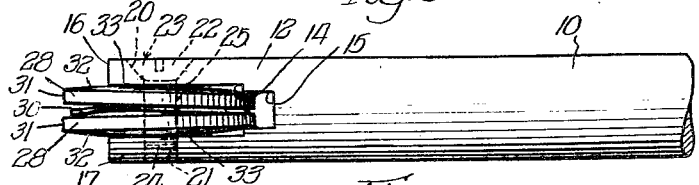
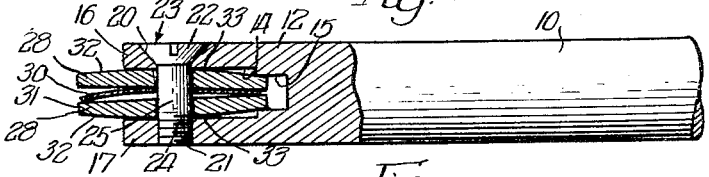
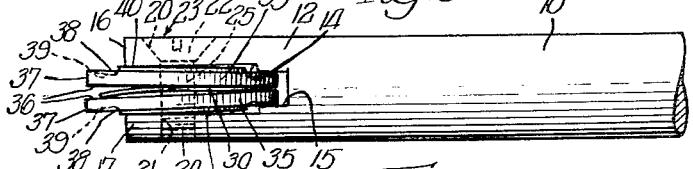
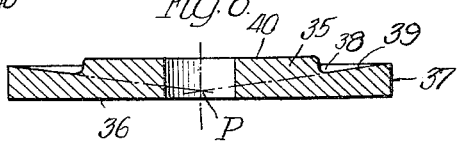
INVENTOR.
Bernard H. York,
BY
Cromwell, Greist & Warden
Attys

# United States Patent Office 2,961,022
Patented Nov. 22, 1960

2,961,022

RECESS-GRIPPING DRIVER

Bernard H. York, Granada Hills, Calif., assignor to Voi-Shan Industries, Inc., a corporation of Illinois Filed Apr. 6, 1959, Ser. No. 804,515

8 Claims. (Cl. 145—50)

The present invention relates generally to a driver for screws or other fasteners having recessed slots formed in the heads thereof and more particularly to a driver of the type which is adapted to grip such fasteners.

It is an important object of the invention to provide a new and improved driver for fasteners having a slotted head wherein the driving end thereof is adapted to be grippingly engaged in the slot formed in the head of the fastener to be driven.

It is a more specific object of the invention to provide a new and improved recess-gripping driver wherein a pair of matched driving members are supported on a common axis in a slot formed in a bifurcated end portion of the driver shaft and wherein the driving members are normally urged apart resiliently but are adapted to be forced or squeezed together for engagement in a recessed slot formed in the head of a fastener to be driven.

A further object of the invention is to provide a driver of the character described which may be provided with a plurality of interchangeable pairs of driving members having variously shaped fastener engaging portions whereby the driver may be used with fasteners having heads with recessed slots of different shapes formed therein.

Another object of the invention is to provide a recess-gripping driver of the character described which is simple in construction, sturdy, and easily operable, and which may be economically manufactured.

For a more complete understanding of the nature and scope of the invention, reference may now be had to the accompanying drawings wherein:

Fig. 1 is a side elevational view of a driver embodying the invention;

Fig. 2 is an enlarged side elevational view of the driving end of the driver shown in Fig. 1;

Fig. 3 is an elevational view taken at right angles to Fig. 2;

Fig. 4 is a horizontal section taken generally on the line 4—4 of Fig. 2;

Fig. 5 is an elevational view similar to Fig. 3 but showing a pair of specially designed driving members; and Fig. 6 is an enlarged vertical section taken through the axis of the upper driving member as shown in Fig. 5.

The driver shown in Fig. 1 includes a driver shaft 10 having a shank portion 11 and a bifurcated or slotted end portion 12. A handle 13, which may be of any suitable type, is shown secured to the shank portion 11 of the driver shaft 10.

As best shown in Figs. 3 and 4, the bifurcated end portion 12 provides a longitudinal slot 14 which is open at the end of the shaft 10 and which is aligned with the longitudinal axis thereof. The inner end of the slot 14 is preferably provided with a narrowed or reduced-in-width portion 15, for a purpose which will be fully explained hereinafter. The bifurcated end portion 12 also provides a pair of spaced-apart arms 16 and 17. Two axially aligned openings 20 and 21 are formed, respectively, in the arms 16 and 17 with the common axis thereof being disposed somewhat closer to the outer open end of the slot 14 than to the inner end thereof and extending through the slot 14. The opening 20 is formed so as to receive a head 22 of a flat head screw 23 and the opening 21 is internally threaded to receive the externally threaded end portion 24 thereof with a substantial portion 25 of the screw shank adapted to be disposed in the slot 14. The portion 25 of the screw shank which is disposed wholly within the slot 14 may, if desired, be unthreaded.

A pair of identically matched, centrally bored driving members 28—28 are rotatably mounted on the shank 25 of the flat head screw 23. The combined thickness of the two driving members 28—28 at the hub portions thereof is less than the width of the slot 14 so that the two members 28—28 are tiltable and movable on the shank portion 25 of the flat head screw 23 toward and away from each other as well as being rotatable thereon. The driving members 28—28 are preferably of a size such that the portions thereof which are disposed in the slot 14 inwardly of the screw 23 extend beyond the end of the widest portion thereof and thus into the reduced-in-width portion 15 where the innermost edges of the driving members 28—28 are confined closely adjacent to each other, as shown in Figs. 3 and 4. A spring, such as a dished washer 30 formed of spring steel, is mounted on the shank portion 25 of the flat head screw 23 between the two driving members 28—28 whereby the driving members normally have their outermost edges forced apart relative to their innermost edges which are confined in the reduced-in-width portion 15 of the slot 14, the normal divergence of the driving members 28—28 being shown in Figs. 3 and 4. It is to be understood that a suitable coil spring could be substituted for the spring washer 30.

With this arrangement, the outermost edges of the two driving members 28—28 are adapted to be forced or pinched together manually until the spring washer 30 is substantially flattened therebetween. It is evident from the drawings, with the innermost edges of the driving members 28—28 confined closely adjacent to each other in the narrowed portion 15 of the slot 14, that when the outermost edges of the members 28—28 are forced or pinched together, the driving members are pivotable about their innermost edges with a hinge-like action until they are substantially parallel to each other. When the outermost edges of the driving members 28—28 are released, the two driving members are moved apart by the spring washer 30 into their normally diverging positions shown in Figs. 3 and 4. In the illustrated embodiment of the invention the driving members 28—28 have been shown as circular discs but it is to be understood that the driving members could be formed with other suitable basic shapes, such as oval, square, or rectangular shapes.

The diameter of the circular driving members 28—28 shown in the drawings is such that the peripheral edges 31—31 thereof project a substantial distance from the open end of the slot 14 and thus away from the bifurcated end portion 12 of the driver shaft 10. The peripheral edges 31—31 of the driving members 28—28 when squeezed or forced together, the spring washer 30 being substantially flattened, are adapted to define the driving end of the driver and, therefore, the peripheral edges of different driving members may be provided with the desired shape or design to adapt the driver for use with fastener members having variously designed recessed slots formed in the heads thereof. The profile of the combined peripheral edges 31—31 of the driving members 28—28, shown in Figs. 2, 3 and 4, corresponds generally to the driving end of a standard screw driver, although the opposed faces could be parallel instead of tapered. In the illustrated embodiment of the invention, the outer face 32 of each of the circular driving members 28 tapers inwardly toward the peripheral edge 31 thereof whereby the thickness of each circular driving member 28 at the peripheral edge 31 thereof is less than the thickness at the hub 33 thereof. The driving members 28—28 may therefore be used with fastener members having slotted heads of standard form.

In Fig. 5, the driver is shown with a pair of circular driving members 35—35 having differently shaped fastener engaging portions. The driving members 35—35 are mounted on the shank portion 25 of the flat head screw 23 which extends through the bifurcated end portion 12 of the driving shaft 10. The driving members 35—35 are specially designed for use with fastener members having heads provided with undercut slots such as the type disclosed in Vaughn Patent 2,677,985, dated May 11, 1954. This type slotted recess diverges outwardly from the center of the fastener, is undercut at the sides where the driving torque is applied, and has an arcuate base. As best shown in Fig. 6, the inner surface 36 of each of the circular driving members 35 is flat and the outer surface diverges radially outwardly toward a peripheral edge 37 from a circumferential line 38 spaced radially inwardly from the peripheral edge 37 to define a surface 39 which may be described as a non-planar conical surface of revolution. If radially directed lines are drawn at an inclination defined by the diverging characteristics of the surface 39, such lines will intersect the axis of the circular driving member 35 at a point P which constitutes the apex of a cone. The surface 39 is thus a conical surface of revolution and is non-planar since the various radially directed lines converging at the point P do not lie in a single plane yet they constitute straight lines which lie on different portions of the surface 39. The thickness of each circular driving member 35 at its peripheral edge 37 is therefore greater than the thickness thereof at the circumferential line 38. The outer surface of each circular driving member 35 also diverges radially inwardly toward the center thereof from the circumferential line 38 to a generally flat hub surface 40.

The specific forms of designs of the driving members shown and described herein are merely examples of the many different designs of driving members that may be utilized within the scope of the invention.

In use, the outwardly disposed peripheral edges of a pair of driving members, the particular design or form thereof being chosen according to the type of recessed slots formed in the heads of the members to be driven, are forced together as they are inserted into the recessed or undercut slot formed in the head of a fastener member to be driven. Upon release of the driving members, the spring washer 30, which has been substantially flattened between the driving members, urges them apart and into gripping engagement with the opposite sides of the recessed or undercut slot in the fastener head. The fastener member is thus releasably attached to the driving end of the driver. The recess-gripping driver disclosed herein is particularly useful in driving fasteners in overhead locations and at locations which are either remote or hard to reach.

The reduced-in-with portion 15 of the slot 14 serves to exploit the full load-storing capacity of the spring 30 by normally "pinching" together the inwardly disposed peripheral edges of the driving members. With this arrangement, the entire spring is compressed flatwise when the outwardly disposed peripheral edges of the driving members are "pinched" together and inserted in a slot formed in the head of a fastener member. When the inwardly disposed edges of the driving members are not confined in the reduced-in-width portion 15 of the slot 14, only about one-half of the spring action is utilized when the outwardly disposed edges of the driving members are inserted in a slot in the head of a fastener member.

It will be understood that certain changes may be made in the structure disclosed herein without departing from the spirit and scope of the invention as defined in the appended claims.

I claim:

1. A recess-gripping driver for fastener members having heads provided with recessed slots comprising, a driver shaft having a slot formed in the end thereof, a pair of matched driving members mounted in said slot about a common axis and for movement toward and away from each other, said slot having a narrowed portion at its inner end within which the innermost peripheral edges of said pair of driving members are confined closely adjacent to each other, and resilient means disposed about said common axis and between said pair of driving members for urging said driving members apart whereby said pair of driving members are normally diverged outwardly from said confined innermost edges thereof, the outermost peripheral edges of said normally diverging driving members being adapted to be forced together against the action of said resilient means and resiliently engaged in a recessed slot formed in a fastener head.

2. A recess-gripping driver for fastener members having heads provided with recessed slots comprising, an elongated driver shaft having a longitudinal, open slot formed in one end thereof, a supporting member extending through said slot at right angles to said shaft, a pair of matched circular driving members movably mounted on said supporting member and having a combined thickness which is less than the width of said slot, the peripheral edges of said circular driving members extending beyond said one end of said shaft, and resilient means disposed on said supporting members between said driving members whereby to normally urge them toward opposite sides of said slot, said driving members being adapted to be squeezed together to permit positioning the peripheral edges thereof within a recessed slot in a fastener head whereupon release of the driving members permits said resilient means to force the driving members apart into gripping engagement with opposite sides of the recessed slot in the fastener head.

3. A recess-gripping driver for fastener members having heads provided with recessed slots comprising, a shaft having a bifurcated end portion defining an open-ended slot, a handle attached to the other end of said shaft, a screw extending through said bifurcated end portion at right angles to said shaft, a matched pair of centrally bored driving members having a combined thickness less than the width of the slot movably mounted on the portion of said screw disposed within said slot, said driving members being of a size whereby portions of the peripheral edges thereof extend beyond said bifurcated end portion of said shaft, spring means mounted on said screw between said pair of driving members for normally urging the driving members away from each other, and the inner end of said slot having a narrowed portion adapted to receive the innermost peripheral edges of said driving members whereby the outermost peripheral edges normally diverge away from each other under the influence of said spring means, said diverging outermost peripheral edges of said pair of driving members being adapted to be first forced together to permit positioning the same within a recessed slot in a fastener head and then to be released whereupon they are urged away from each other by said spring means into gripping engagement with opposite sides of the recessed slot in the fastener head.

4. A recess-gripping driver for fastener members having heads provided with recessed slots comprising, an elongated driver shaft having a shank portion at one end, a handle secured to said shank portion, said shaft having a longitudinally extending slot in the other end aligned with the longitudinal axis of the shaft, said slot being open at said other end of said shaft whereby to define a pair of spaced arms, said arms having a pair of aligned openings formed one in each arm with the common axis thereof extending through said slot adjacent the open end thereof, one of said openings being formed to receive the head of a screw and the other one of said openings having an internal thread formed therein, a screw assembled in said pair of openings, a pair of centrally bored circular driving members rotatably mounted on the portion of said screw disposed within said slot and having a combined thickness which is less than the width of said slot, said pair of circular driving members having the same diameter with said diameter being such that the peripheral edges of said driving members extend beyond said other end of said shaft, and spring means disposed about said screw intermediate said pair of driving members whereby to normally urge them toward opposite sides of said slot, the peripheral edges of said pair of driving members, when the driving members are forced together, being adapted to be inserted into a recessed slot in a fastener head whereby upon their release the driving members are adapted to be forced apart by said spring means into gripping engagement with opposite sides of the recessed slot in the fastener head.

5. A recess-gripping driver as recited in claim 4 wherein means are provided adjacent the inner end of said slot for normally forcing the innermost peripheral edges of said driving members together to partially compress said spring means therebetween and thus cause the outermost peripheral edges of said driving members to diverge away from each other, whereby said spring means is substantially fully compressed when said outermost diverging peripheral edges of said driving members are forced together for insertion into a recessed slot in a fastener head.

6. A recess-gripping driver for fastener members having heads provided with undercut slots comprising, an elongated driver shaft having a longitudinal, open slot formed in one end thereof, a supporting member extending through said slot at right angles to said shaft, a pair of matched circular driving members movably mounted on said supporting member and having a combined thickness at the peripheral edges thereof which is less than the width of said slot, the peripheral edges of said driving members extending beyond said one end of said shaft, each of said circular driving members having a thickness at a circumferential line intermediate its center and peripheral edge which is less than the thickness of the driving member at said peripheral edge with the outer side surface of each driving member diverging radially outwardly toward the peripheral edge thereof from said circumferential line to define a non-planar conical surface of revolution, and resilient means disposed on said supporting member between said driving members whereby to normally urge said driving members toward opposite sides of said slot, said driving members being adapted to be squeezed together to permit positioning the peripheral edges thereof within an undercut slot in a fastener head whereupon release of the driving members permits said resilient means to force the driving members apart into gripping engagement with opposite sides of the undercut slot in the fastener head.

7. A recess-gripping driver for fastener members having heads provided with undercut slots comprising, a shaft having a bifurcated end portion defining an open-ended slot, a handle attached to the other end of said shaft, a screw extending through said bifurcated end portion at right angles to said shaft, a matched pair of centrally bored circular driving members having a combined thickness at the peripheral edges thereof less than the width of the slot movably mounted on the portion of said screw disposed within said slot, said driving members being of a size whereby the peripheral edges thereof extend beyond said bifurcated end portion of said shaft, each of said circular driving members having a thickness at a circumferential line intermediate its center and peripheral edge which is less than the thickness of the driving member at said peripheral edge with the outer surface of each driving member diverging radially outwardly toward the peripheral edge thereof from said circumferential line to define a non-planar conical surface of revolution, spring means mounted on said screw between said pair of driving members for normally urging them away from each other, and means adjacent the inner end of said slot for forcing the innermost peripheral edges of said driving members together whereby the outermost peripheral edges normally diverge away from each other under the influence of said spring means, said diverging outermost peripheral edges of said pair of driving members being adapted to be first forced together to permit positioning the same within an undercut slot in a fastener head and then to be released whereupon they are urged away from each other by said spring means into gripping engagement with opposite sides of the undercut slot in the fastener head.

8. A recess-gripping driver for fastener members having heads provided with undercut slots comprising, an elongated driver shaft having a shank portion at one end, a handle secured to said shank portion, said shaft having a longitudinally extending slot in the other end aligned with the longitudinal axis of the shaft, said slot being open at said other end of said shaft whereby to define a pair of spaced arms, said arms having a pair of aligned openings formed one in each arm with the common axis thereof extending through said slot adjacent the open end thereof, one of said openings being formed to receive the head of a screw and the other one of said openings having an internal thread formed therein, a screw assembled in said pair of openings, a pair of centrally bored circular driving members rotatably mounted on said screw and having a combined thickness at the peripheral edges thereof which is less than the width of said slot, said pair of driving members having the same diameter with said diameter being such that the peripheral edges of said driving members extend beyond said other end of said shaft, each of said driving member having a thickness at a circumferential line intermediate its center and peripheral edge which is less than the thickness of the driving member at said peripheral edge with the outer side surface of each driving member diverging radially outwardly toward the peripheral edge thereof from said circumferential line to define a non-planar conical surface of revolution, spring means disposed about said screw intermediate said pair of driving members whereby to normally urge them toward opposite sides of said slot, and the inner end of said slot having a narrowed portion adapted to force the innermost peripheral edges of said driving members together whereby said spring means is partially compressed and said driving members are normally diverged apart in an outward direction, the outermost peripheral edges of said pair of normally diverging members, when the same are squeezed together to substantially fully compress said spring means, being adapted to be positioned within an undercut slot in a fastener head whereby upon their release the driving members are adapted to be forced apart by said spring means into gripping engagement with opposite sides of the undercut slot in the fastener head.

References Cited in the file of this patent

UNITED STATES PATENTS

| | | |
|---|---|---|
| 1,075,225 | Reamy | Oct. 7, 1913 |
| 2,301,590 | Signorellis | Nov. 10, 1942 |
| 2,631,623 | West | Mar. 17, 1953 |
| 2,832,385 | Oliveri | Apr. 29, 1958 |
| 2,864,418 | Vaughn | Dec. 16, 1958 |

UNITED STATES PATENT OFFICE
CERTIFICATION OF CORRECTION

Patent No. 2,961,022     Bernard H. York     November 22, 1960

It is hereby certified that error appears in the above numbered patent requiring correction and that the said Letters Patent should read as corrected below.

Column 3, line 59, for "reduced-in-with" read -- reduced-in-width --; column 6, line 59, after "diverging" insert -- driving --.

Signed and sealed this 2nd day of May 1961.

(SEAL)
Attest:
ERNEST W. SWIDER
Attesting Officer

DAVID L. LADD
Commissioner of Patents